(12) United States Patent
Veilleux, Jr.

(10) Patent No.: US 12,163,593 B2
(45) Date of Patent: Dec. 10, 2024

(54) MULTI-SURFACE SEALING FOR TWO-POSITION VALVES

(71) Applicant: Hamilton Sundstrand Corporation, Charlotte, NC (US)

(72) Inventor: Leo J. Veilleux, Jr., Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/140,761

(22) Filed: Apr. 28, 2023

(65) Prior Publication Data

US 2024/0360903 A1 Oct. 31, 2024

(51) Int. Cl.
*F16K 1/44* (2006.01)
*F16K 1/46* (2006.01)
*F16K 27/02* (2006.01)

(52) U.S. Cl.
CPC ............... *F16K 1/44* (2013.01); *F16K 1/465* (2013.01); *F16K 27/02* (2013.01)

(58) Field of Classification Search
CPC . F16K 1/44; F16K 1/443; F16K 11/04; F16K 27/0263
See application file for complete search history.

(56) References Cited

U.S. PATENT DOCUMENTS

| 4,444,214 A | 4/1984 | Paul, Jr. |
| 4,995,589 A | 2/1991 | Adishian et al. |
| 9,140,369 B2 | 9/2015 | Dalluge |
| 9,354,638 B2 * | 5/2016 | Rebreanu ................. F16K 1/12 |
| 2019/0331030 A1 | 10/2019 | Kelly et al. |

FOREIGN PATENT DOCUMENTS

| DE | 3034056 C2 * | 8/1989 | |
| WO | WO-2005083309 A1 * | 9/2005 | ............. F16K 1/385 |

OTHER PUBLICATIONS

Extended European Search Report for EP Application No. 24173062.1, Dated Sep. 24, 2024, p. 9.

* cited by examiner

*Primary Examiner* — Hailey K. Do
(74) *Attorney, Agent, or Firm* — Kinney & Lange, P. A.

(57) ABSTRACT

A valve includes a housing. A stroking valve is operatively connected to the housing for valve stroking movement relative to the housing in a direction of a longitudinal axis of the housing. The stroking valve has an open position for flow through the housing and a closed position for blocking flow through the housing. The stroking valve is configured to make sealing contact with a second face seal between the seal block and the stroking valve after a first portion of a stroke from the open position to the closed position prior to making sealing contact with a first face seal between the stroking valve and the housing.

11 Claims, 5 Drawing Sheets

MULTI-SURFACE SEALING FOR TWO-POSITION VALVES

BACKGROUND

1. Field

The present disclosure relates to valves, and more particularly to sealing in valves such as two-position valves.

2. Description of Related Art

There is a need for valves to have multi-surface sealing where two or more locations on a valve are required to seal with the valve in a closed state. With multiple tolerance stackups in all of the parts related to the multiple surface sealing system, it can be difficult to assure sealing without applying significant loads to assure all seal locations compress and fully seal. One solution is to utilize very tight tolerances, however this can add considerable cost of manufacturing.

The conventional techniques have been considered satisfactory for their intended purpose. However, there is an ever present need for improved systems and methods for sealing multiple surfaces in valves such as two-position valves. This disclosure provides a solution for this need.

SUMMARY

A valve includes a housing. A stroking valve is operatively connected to the housing for valve stroking movement relative to the housing in a direction of a longitudinal axis of the housing. The stroking valve has an open position for flow through the housing and a closed position for blocking flow through the housing. A first biasing member is operatively connected between the housing and the stroking valve, biasing the stroking valve in a first direction toward the closed position. A seal block is operatively connected to the housing for stroking movement relative to the housing in the direction of the longitudinal axis. A second biasing member is operatively connected between the housing and the seal block, biasing the seal block in a second direction opposite the first direction. A first face seal is positioned to seal between the stroking valve and the housing with the stroking valve in the closed position. A second face seal is positioned to seal between the stroking valve and the seal block. The stroking valve is configured to make sealing contact with the second face seal between the seal block and the stroking valve after a first portion of a stroke from the open position to the closed position prior to making sealing contact with the first face seal between the stroking valve and the housing.

The first face seal can be seated in a face seal channel in the stroking valve. The face seal channel in the stroking valve can open toward a face sealing surface of the housing. The second face seal can be seated in a face seal channel in the seal block. The face seal channel in the seal block can open toward a face sealing surface of the stroking valve.

A first radial seal can seal between the housing and the seal block. The first radial seal can be seated in a radial seal channel in the seal block. The radial seal channel in the seal block can open toward a first radial facing seal face of the housing. A second radial seal can seal between the housing and the stroking valve. The second radial seal can be seated in a radial seal channel in the stroking valve. The radial seal channel in the stroking valve can open toward a second radial facing seal face of the housing.

With the stroking valve in the closed position, a first volume of the housing can be separated from a second volume of the housing by a drip tight seal at each of the first face seal, the second face seal, the first radial seal, and the second radial seal. Each of
the face seal channel in the stroking valve,
the face seal channel in the seal block,
the radial seal channel in the seal block,
the radial seal channel in the stroking valve,
the face sealing surface of the housing,
the face sealing surface of the stroking valve,
the first radial facing seal face of the housing, and
the second radial facing seal face of the housing
need be made within no tighter than standard tolerances. The radial facing seal face of the housing can include a ramp step configured to relieve load for the stroking valve to approach the closed position beyond the first portion of the stroke.

The first biasing member can include a coiled spring that is in compression in the open position of the stroking valve. The second biasing member can include a disc spring in constant compression with the stroking valve in the first portion of the stroke and in increasing compression with the stroking valve between the first portion of the stroke and the closed position. A retainer can be fixed relative to the housing. The second biasing member can be seated between the seal bock and the retainer in an axial direction. The stroking valve can be configured return from the closed position to the open position, first breaking sealing contact with of the first face seal then breaking sealing contact with the second face seal.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
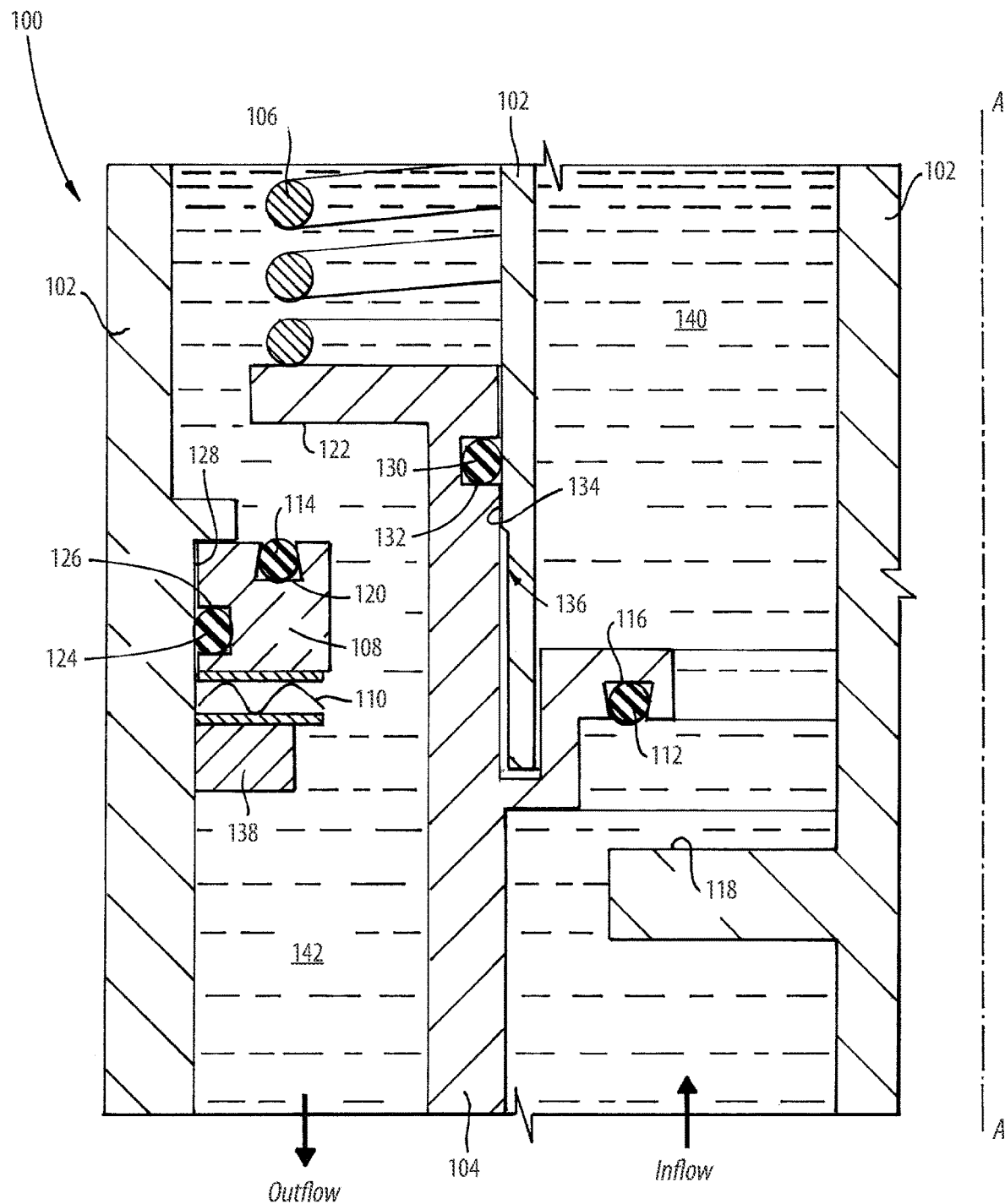
FIG. 1 is a cross-sectional view of an embodiment of a valve constructed in accordance with the present disclosure, showing the housing and stroking valve with the stroking valve in the open position.

Reference will now be made to the drawings wherein like reference numerals identify similar structural features or aspects of the subject disclosure. For purposes of explanation and illustration, and not limitation, a partial view of an embodiment of a valve in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to provide two-surface sealing in valves with reduced tolerancing and/or reduced loading on the seals relative to traditional multi-surface sealing arrangements.

The valve 100 includes a housing 102, three portions of which are shown in FIG. 1. The longitudinal axis A of the valve is shown in FIG. 1, e.g. as a centerline about which the geometry of the valve 100 is cylindrically defined. A stroking valve 104 is operatively connected to the housing 102 for valve stroking movement relative to the housing 102 in a direction of the longitudinal axis A. The stroking valve 104 has an open position shown in FIG. 1 for flow through the housing 102 (as indicated by the flow arrows in FIG. 1) and a closed position, shown in FIG. 3, for blocking flow through the housing 102.

Figure 2:
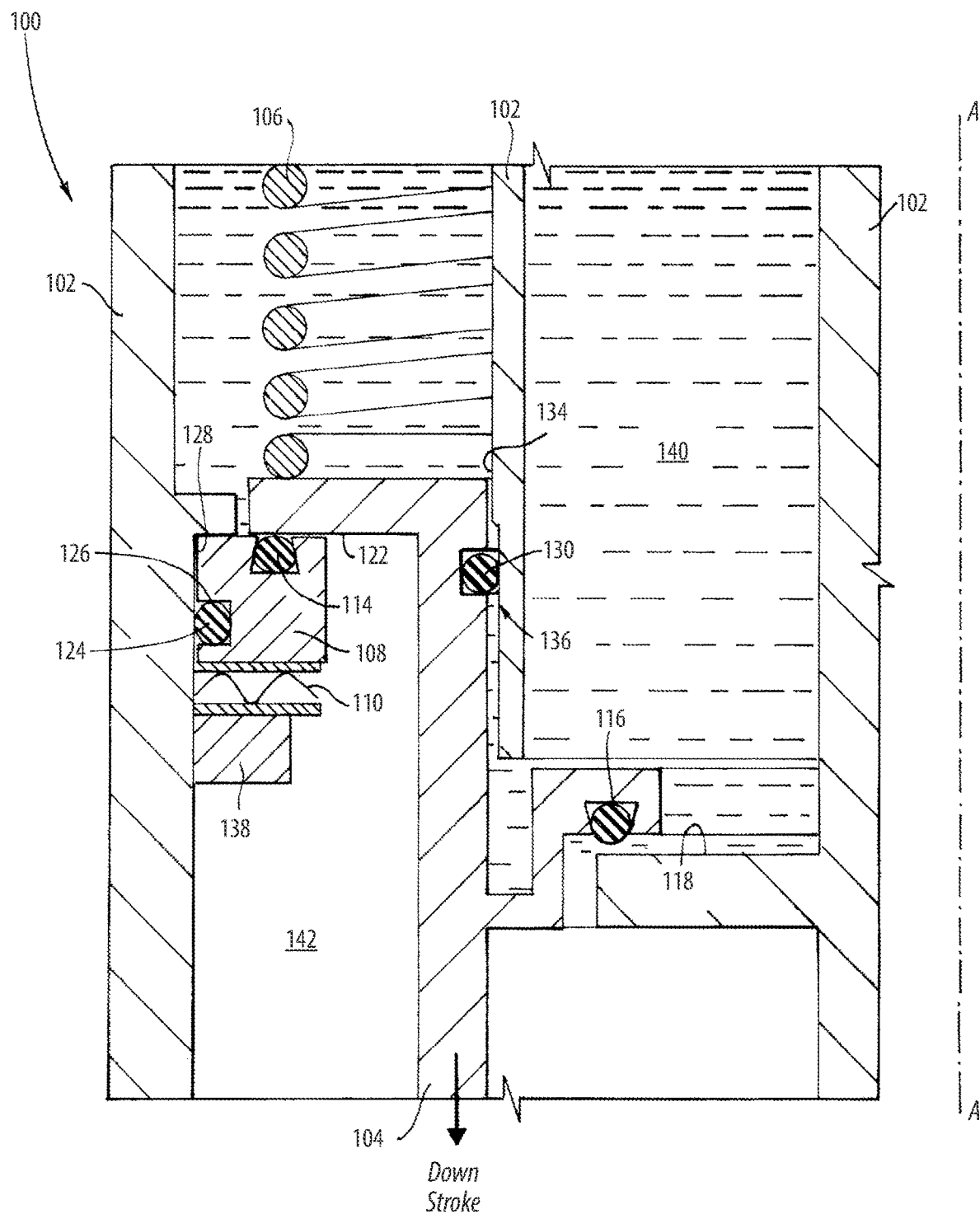
FIG. 2 is a cross-sectional view of the valve of FIG. 1, showing the position of the stroking valve after a first portion of the stroke where the first face seal makes contact.

A first biasing member 106, e.g. a coiled spring or other suitable resilient body, is operatively connected between the housing 102 and the stroking valve 104, biasing the stroking valve 104 in a first direction, i.e. downward as oriented in FIG. 1, toward the closed position shown in FIG. 2. The first biasing member 106 is in compression in the open position of the stroking valve 104 as shown in FIG. 1.

A seal block 108 is operatively connected to the housing 102 for stroking movement relative to the housing 102 in the direction of the longitudinal axis A. A second biasing member 110, e.g. a relatively thin, light disc spring, Belleville washer, or other suitable resilient body, is operatively connected between the housing 102 and the seal block 108, biasing the seal block 108 in a second direction opposite the first direction, i.e. the second spring biases the seal block 108 in the upward direction as oriented in FIG. 1. The second biasing member 110 is in constant compression with the stroking valve 104 in the first portion of the stroke, i.e. in the position in FIG. 1 and every position between there and the position shown in FIG. 2. Below the position of the stroking valve 104 shown and as oriented in FIG. 2, the second biasing member 110 is in increasing compression with the stroking valve 104 moving between the position shown in FIG. 2 and the closed position shown in FIG. 3. A retainer 138 is fixed relative to the housing 102. The second biasing member 110 is seated between the seal bock 108 and the retainer 110 in an axial direction, i.e. in the direction along the longitudinal axis A.

Figure 3:
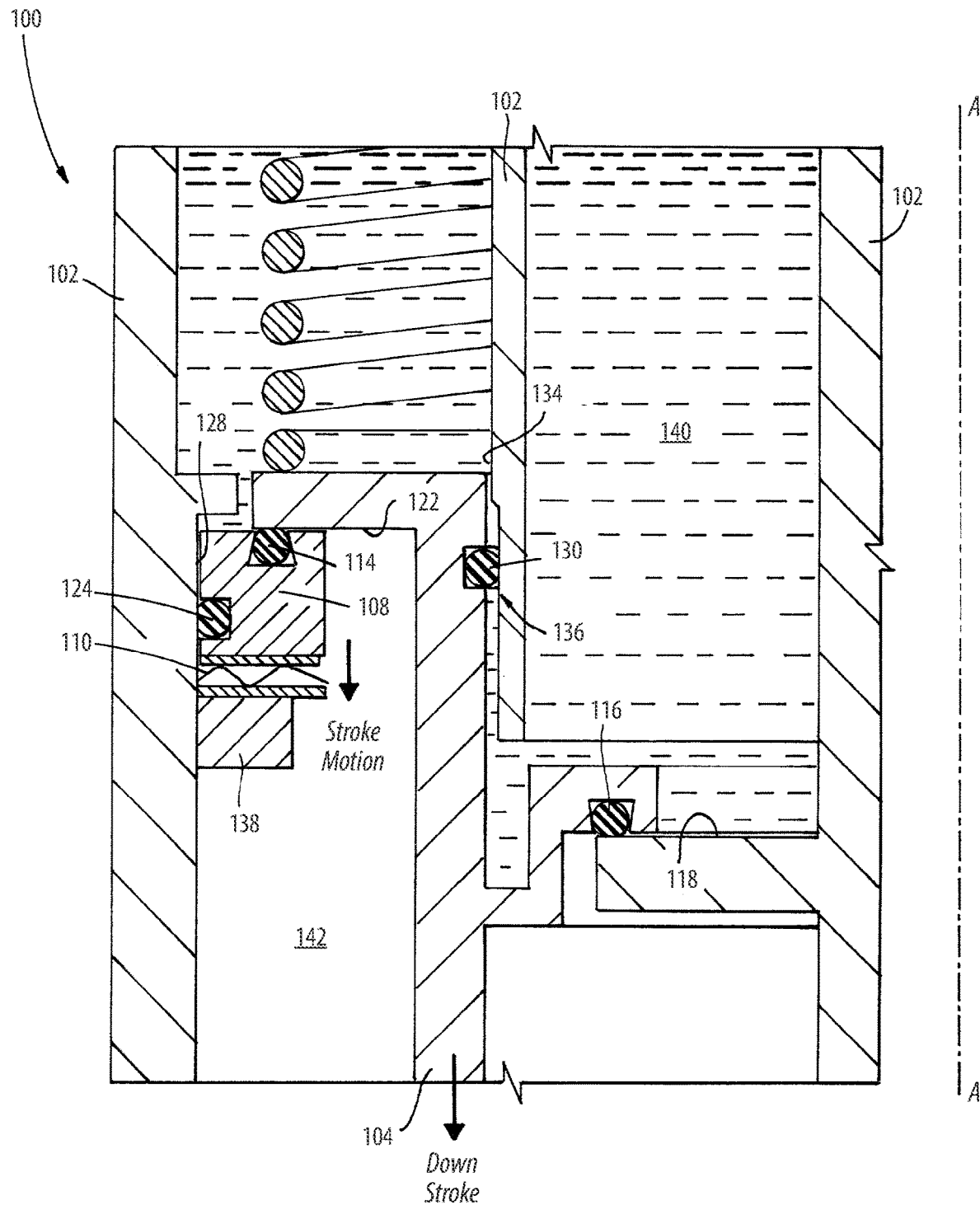
FIG. 3 is a cross-sectional view of the valve of FIG. 2, showing the closed position of the stroking valve and a seal block, which holds the first seal of FIG. 2.

A first face seal 112 is positioned to seal between the stroking valve 104 and the housing 102 with the stroking valve in the closed position as shown in FIG. 3. A second face seal 114 is positioned to seal between the stroking valve 104 and the seal block 108. The stroking valve 104 is configured to make sealing contact with the second face seal 114 between the seal block 108 and the stroking valve 104 after a first portion of a stroke, i.e. at the position shown in FIG. 2, from the open position of FIG. 1 to the closed position of FIG. 3, prior to making sealing contact with the first face seal 112 between the stroking valve 104 and the housing 102. The second biasing member 110 accommodates movement of the seal block and stroking valve 104 past the first portion of the stroke, i.e. as the stroking valve 104 continues to move past the position in FIG. 2 to the closed position in FIG. 3.

The first face seal 112 is seated in a face seal channel 116 in the stroking valve 104. The face seal channel 116 opens toward a face sealing surface 118 of the housing 102. The second face seal 114 is seated in a face seal channel 120 in the seal block 108. The face seal channel 120 opens toward a face sealing surface 122 of the stroking valve 104.

A first radial seal 124 seals between the housing 102 and the seal block 108. The first radial seal 124 is seated in a radial seal channel 126 in the seal block 108. The radial seal channel 126 opens toward a first radial facing seal face 128 of the housing 102. A second radial seal 130 seals between the housing 102 and the stroking valve 104. The second radial seal 130 is seated in a radial seal channel 132 in the stroking valve 104. The radial seal channel 132 opens toward a second radial facing seal face 134 of the housing 104. The radial facing seal face 134 includes a ramp step 136 configured to slightly relieve seal load while still sealing for the stroking valve 104 to approach the closed position of FIG. 3 beyond the first portion of the stroke, i.e. below the position shown in FIG. 2.

With the stroking valve 104 in the closed position shown in FIG. 3, a first volume 140 of the housing 102 is separated from a second volume 142 of the housing 104 by a drip tight seal at each of the first face seal 112, the second face seal 114, the first radial seal 124, and the second radial seal 130. The stroking valve 104 is configured return from the closed position shown in FIG. 3 to the open position shown in FIG. 1, first breaking sealing contact with of the first face seal 112 then breaking sealing contact with the second face seal 114 after passing back through the position shown in FIG. 2.

Each of the face seal channel 116, the face seal channel 120, the radial seal channel 126, the radial seal channel 132, the face sealing surface 118, the face sealing surface 122, the first radial facing seal face 128, and the second radial facing seal face 134 need be made within no tighter than standard tolerances, e.g. of the range of +/−0.002 inches, (0.05 mm) to +/−0.005 inches, (0.127 mm).

Figure 4:
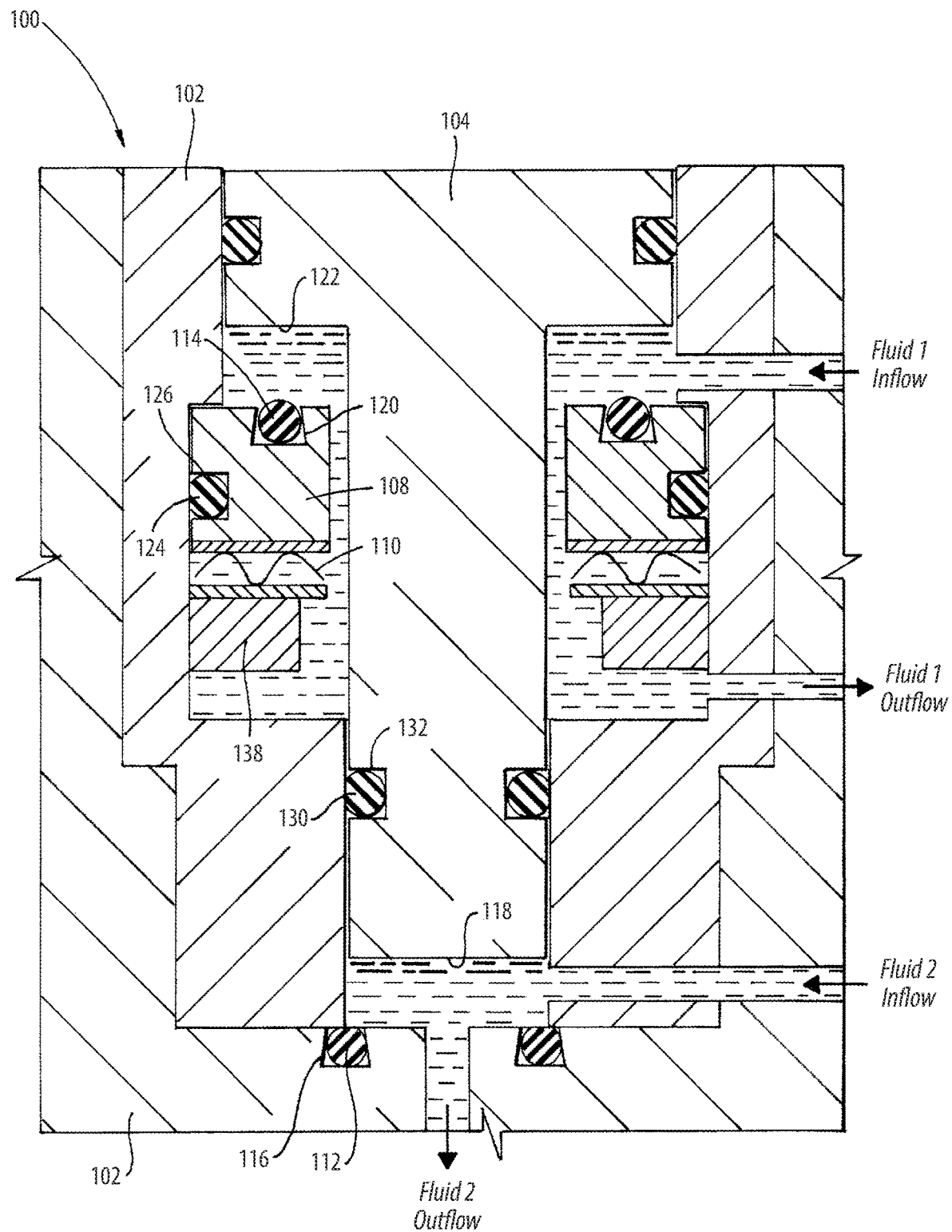
FIG. 4 is a cross-sectional view of another embodiment of a valve constructed in accordance with the present disclosure, showing two separate fluid flows through the valve in the open position.
Figure 5:
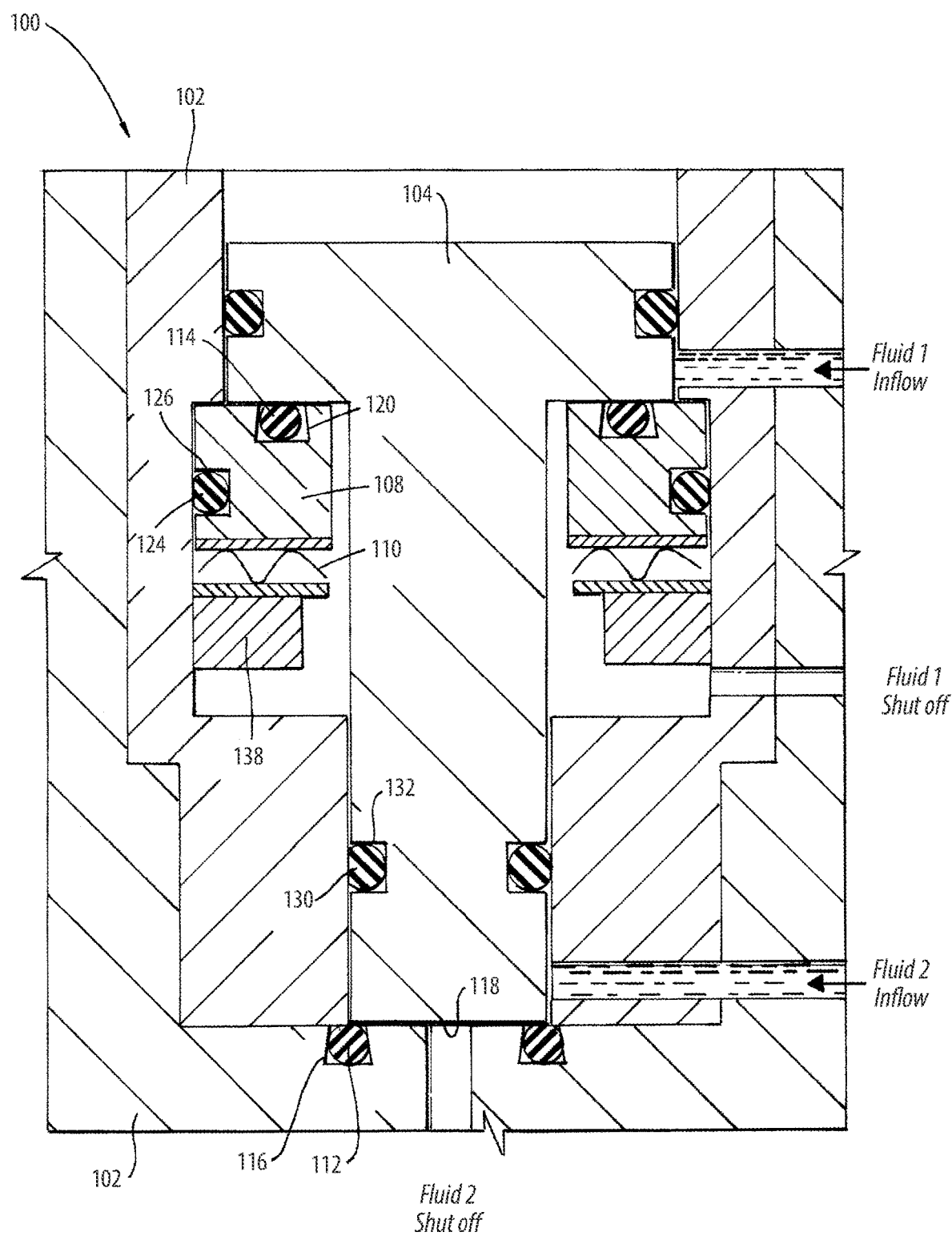
FIG. 5 is a cross-sectional view of the valve of FIG. 4, showing flow blocked for both fluid flows.

With reference now to FIG. 4, another embodiment of the valve 100 is shown, wherein there are two fluid flow paths, labeled Fluid 1 and Fluid 2, through the valve 100. Like reference numerals are used in FIG. 4 as to FIG. 1 above, and the description and operation of like numbered elements are the same. One variation is that the seal 112 and its gland 115 are located in the stationary housing 102, rather than in the stroking valve 104. The sealing surface 118 is on the stroking valve 104, rather than on the housing 102, which is reversed from the embodiment of FIGS. 1-3. FIG. 5 shows the closed position of the valve 100, which shuts off flow for both fluids, Fluid 1 and Fluid 2.

Systems and methods as disclosed herein provide potential benefits including the following. More traditional configurations to utilize a large heavy spring to accommodate all of the tolerances and assure drop tight seal. In accordance with the present disclosure, a relatively low load spring can be used to assure sealing on the two face seal locations. This approach can result in the ability to achieve drop tight seal on two surfaces, utilizing standard traditional tolerances used for single surface sealing, and low spring force in the two-position valve while saving weight and improving manufacturability and field reliability of the seals. It should be noted that while a two surface seal system is described, the approach is valid for multiple sealing surfaces greater than two with all but the first sealing surface having sliding block seals system as described.

The methods and systems of the present disclosure, as described above and shown in the drawings, provide for two-surface sealing in valves with reduced tolerancing and/or reduced loading on the seals relative to traditional multi-surface sealing arrangements. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A valve comprising:
   a housing;
   a stroking valve operatively connected to the housing for valve stroking movement relative to the housing in a direction of a longitudinal axis of the housing, wherein the stroking valve has an open position for flow through the housing and a closed position for blocking flow through the housing;
   a first biasing member operatively connected between the housing and the stroking valve, biasing the stroking valve in a first direction toward the closed position;
   a seal block operatively connected to the housing for stroking movement relative to the housing in the direction of the longitudinal axis;
   a second biasing member operatively connected between the housing and the seal block, biasing the seal block in a second direction opposite the first direction;
   a first face seal positioned to seal between the stroking valve and the housing with the stroking valve in the closed position, wherein the first face seal is seated in a face seal channel in the stroking valve, and wherein the face seal channel in the stroking valve opens toward a face sealing surface of the housing;
   a second face seal positioned to seal between the stroking valve and the seal block, wherein the stroking valve is configured to make sealing contact with the second face seal between the seal block and the stroking valve after a first portion of a stroke from the open position to the closed position prior to making sealing contact with the first face seal between the stroking valve and the housing, and wherein the second face seal is seated in a face seal channel in the seal block, and wherein the face seal channel in the seal block opens toward a face sealing surface of the stroking valve; and
   a radial seal sealing between the housing and the stroking valve, wherein the radial seal is seated in a radial seal channel in the stroking valve, wherein the radial seal channel in the stroking valve opens toward a radial facing seal face of the housing.

2. The valve seal as recited in claim 1, wherein the radial facing seal face of the housing includes a ramp step configured to relieve load while sealing for the stroking valve to approach the closed position beyond the first portion of the stroke.

3. The valve as recited in claim 1, wherein the first biasing member includes a coiled spring that is in compression in the open position of the stroking valve.

4. The valve as recited in claim 1, wherein the second biasing member includes a disc spring in constant compression with the stroking valve in the first portion of the stroke and in increasing compression with the stroking valve between the first portion of the stroke and the closed position.

5. The valve as recited in claim 1, further comprising a retainer fixed relative to the housing, wherein the second biasing member is seated between the seal bock and the retainer in an axial direction.

6. The valve as recited in claim 1, wherein the stroking valve is configured return from the closed position to the open position, first breaking sealing contact with of the first face seal then breaking sealing contact with the second face seal.

7. The valve as recited in claim 1, further comprising a radial seal sealing between the housing and the seal block.

8. The valve seal as recited in claim 7, wherein the radial seal is seated in a radial seal channel in the seal block, wherein the radial seal channel in the seal block opens toward a radial facing seal face of the housing.

9. A valve as comprising:
   a housing;
   a stroking valve operatively connected to the housing for valve stroking movement relative to the housing in a direction of a longitudinal axis of the housing, wherein the stroking valve has an open position for flow through the housing and a closed position for blocking flow through the housing;
   a first biasing member operatively connected between the housing and the stroking valve, biasing the stroking valve in a first direction toward the closed position;
   a seal block operatively connected to the housing for stroking movement relative to the housing in the direction of the longitudinal axis;
   a second biasing member operatively connected between the housing and the seal block, biasing the seal block in a second direction opposite the first direction;
   a first face seal positioned to seal between the stroking valve and the housing with the stroking valve in the closed position, wherein the first face seal is seated in a face seal channel in the stroking valve, and wherein the face seal channel in the stroking valve opens toward a face sealing surface of the housing;
   a second face seal positioned to seal between the stroking valve and the seal block, wherein the stroking valve is configured to make sealing contact with the second face seal between the seal block and the stroking valve after a first portion of a stroke from the open position to the closed position prior to making sealing contact with the first face seal between the stroking valve and the housing, and wherein the second face seal is seated in a face seal channel in the seal block, and wherein the face seal channel in the seal block opens toward a face sealing surface of the stroking valve; and
   a first radial seal sealing between the housing and the seal block, wherein the first radial seal is seated in a radial seal channel in the seal block, wherein the radial seal channel in the seal block opens toward a first radial facing seal face of the housing; and
   a second radial seal sealing between the housing and the stroking valve, wherein the second radial seal is seated in a radial seal channel in the stroking valve, wherein the radial seal channel in the stroking valve opens toward a second radial facing seal face of the housing.

10. The valve seal as recited in claim 9, wherein with the stroking valve in the closed position, a first volume of the housing is separated from a second volume of the housing by a drip tight seal at each of the first face seal, the second face seal, the first radial seal, and the second radial seal.

11. The valve seal as recited in claim 9, wherein each of the face seal channel in the stroking valve, the face seal channel in the seal block, the radial seal channel in the seal block, the radial seal channel in the stroking valve, the face sealing surface of the housing, the face sealing surface of the stroking valve, the first radial facing seal face of the housing, and the second radial facing seal face of the housing are all within no tighter than standard tolerances.

\* \* \* \* \*